US011728692B2

(12) United States Patent
Sherman

(10) Patent No.: US 11,728,692 B2
(45) Date of Patent: Aug. 15, 2023

(54) MODEM DESIGN FOR WIRELESS POWER TRANSFER

(71) Applicant: POWERMAT TECHNOLOGIES LTD., Petach Tikva (IL)

(72) Inventor: Itay Sherman, Petach Tikva (IL)

(73) Assignee: POWERMAT TECHNOLOGIES LTD., Petah Tikva (IL)

( * ) Notice: Subject to any disclaimer, the term of this patent is extended or adjusted under 35 U.S.C. 154(b) by 0 days.

(21) Appl. No.: 17/321,842

(22) Filed: May 17, 2021

(65) Prior Publication Data

US 2021/0367457 A1    Nov. 25, 2021

Related U.S. Application Data

(60) Provisional application No. 63/026,742, filed on May 19, 2020.

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC ........ H02J 50/80; H02J 50/12; H04B 5/0031; H04B 5/0037
See application file for complete search history.

(56) References Cited

U.S. PATENT DOCUMENTS

| 6,278,675 | B1* | 8/2001 | Kuribayashi | .... G11B 20/10009 369/124.01 |
| 2002/0071478 | A1 | 6/2002 | Cornwall et al. | |
| 2004/0067765 | A1* | 4/2004 | Wayner | ................. H04B 1/719 455/502 |

(Continued)

FOREIGN PATENT DOCUMENTS

| WO | 98/51069 A2 | 11/1998 |
| WO | 2007/090114 A2 | 8/2007 |
| WO | WO-2021075302 A1 * | 4/2021 |

OTHER PUBLICATIONS

Partial European Search Report dated Oct. 19, 2021 for European Patent Application No. 21174723.3.

(Continued)

*Primary Examiner* — Alfonso Perez Borroto
(74) *Attorney, Agent, or Firm* — Volpe Koenig

(57) ABSTRACT

A power transmitter is provided. The power transmitter may synchronize a sampling start time to a pulse-width modulation signal. The power transmitter may determine an average sampling rate for sampling a power carrier signal. The power transmitter may sample the power carrier signal to obtain sample values. The power transmitter may process the sampled values. The average sampling rate may be N times a data rate. The power transmitter may process the sampled power carrier signal using two digital match filters to produce two separate digital match filter outputs. The power transmitter may determine an amplitude of peaks for the two separate digital match filter outputs. The power transmitter may determine an interval between bits for the two separate digital match filter outputs. The power transmitter may determine whether a transmitted bit is a '0' or '1'.

8 Claims, 11 Drawing Sheets

(56) References Cited

U.S. PATENT DOCUMENTS

| | | | | |
|---|---|---|---|---|
| 2004/0258140 | A1* | 12/2004 | Ramberg | H04B 1/707 |
| | | | | 375/150 |
| 2005/0007277 | A1* | 1/2005 | Iancu | G01S 19/29 |
| | | | | 342/357.68 |
| 2008/0062029 | A1* | 3/2008 | Changqing | H04L 27/0014 |
| | | | | 341/155 |
| 2008/0212663 | A1* | 9/2008 | Lochner | G08C 19/02 |
| | | | | 375/225 |
| 2009/0323494 | A1* | 12/2009 | Sasaki | G11B 20/10212 |
| 2011/0158358 | A1 | 6/2011 | Tseng et al. | |
| 2011/0169446 | A1 | 7/2011 | Kondo | |
| 2012/0326657 | A1* | 12/2012 | Oettinger | H02J 7/00034 |
| | | | | 320/108 |
| 2013/0069618 | A1* | 3/2013 | Depew | H03K 19/0016 |
| | | | | 323/351 |
| 2016/0336759 | A1* | 11/2016 | Yamamoto | H02J 50/60 |
| 2016/0336785 | A1* | 11/2016 | Gao | H04B 5/0031 |
| 2017/0018946 | A1 | 1/2017 | Brink et al. | |
| 2018/0263001 | A1* | 9/2018 | O'Brien | H04W 52/52 |
| 2018/0337528 | A1* | 11/2018 | Taya | H02H 9/04 |
| 2019/0238000 | A1* | 8/2019 | Salvekar | H02J 50/80 |
| 2019/0393734 | A1* | 12/2019 | Zhou | H04B 5/0037 |
| 2020/0403436 | A1* | 12/2020 | Wang | H02J 50/005 |
| 2021/0099016 | A1* | 4/2021 | Bhandarkar | H02J 50/12 |

OTHER PUBLICATIONS

Extended European Search Report dated Jan. 24, 2022 for European Patent Application No. 21174723.3.
Communication pursuant to Article 94(3) EPC dated Dec. 22, 2022 for European Patent Application No. 21174723.3.

* cited by examiner

MODEM DESIGN FOR WIRELESS POWER TRANSFER

CROSS REFERENCE TO RELATED APPLICATION

This application claims the benefit of U.S. Provisional Application No. 63/026,742, filed May 19, 2020, which is incorporated by reference as if fully set forth.

BACKGROUND

The disclosure relates generally to wireless power transfer systems, and more specifically, to modem design for wireless power transfer systems.

In general, most contemporary wireless power transfer systems provide for data transmission between a power transmitter (Tx) and a power receiver (Rx) and conform to one of the established wireless power transfer standards such as Wireless Power Consortium (WPC) or Power Matters Alliance (PMA). Load modulation may be used on a Rx side to transmit data to a Tx side. Load modulation may be performed by switching connection of an ancillary load element such as resistor or capacitor.

A Rx may include a rectification stage that may include a relatively large rectification capacitor that may smooth the transient nature of current coming through the rectification bridge. The ancillary load element, which in most cases may be a capacitor, may be placed before the rectification stage of the Rx.

A state when the ancillary load is connected may be referred to as a modulated state. A state when the ancillary load is disconnected may be referred to as a non-modulated state. A duration of time of the connection and disconnection may be fixed, for example as in WPC, or may vary, for example as in PMA.

Sequences of modulated and non-modulated states may be used to convey data bits from a Rx to a Tx.

For example, in a WPC system, a '0' bit may be coded as a fixed state (modulated or non-modulated) across the whole duration of the bit (for example 500 μs) while a '1' bit may be coded with a transition from modulated to non-modulated state (or vice versa) mid bit. In both cases, a change of state may be performed in the beginning of the bit interval.

In some implementations the data bits comprise a message with a fixed structure. For example, the WPC standards defines a message structure that includes a preamble comprised of a sequence of '1' bits followed by a sequence of data bytes, each data byte comprising a start bit, eight data bits, a parity bit, and a stop bit.

Since modulation is performed by a Rx and the power carrier is created on the Tx side, the modulation is not typically synced to the power carrier. A duration of time of a state may not be an integer multiplication of the carrier cycle, and the state start and state end may have no fixed phase vs. the carrier.

A Tx demodulator needs to be able to distinguish between modulated and non-modulated states and/or to recognize patterns of modulated and non-modulated states. Currently, the standards define this to be performed based on monitoring of Tx primary current or voltage amplitude and phase.

Although modulation on a Rx side is based on two distinct states, the resulting current or voltage envelope wave form on a Tx primary coil does not provide two clear states. The resulting wave form may include additional noise due to excitation of a harmonic resonance mode of the system on state transition. It may also include distortion of the wave form due to the effects of the rectification bridge and its output capacitor. In addition, fluctuations created by changes in the load may also modify the received wave form.

Standard implementation of a Tx demodulator include envelope detection and filtering followed by sampling at the bit rate. Phase may also be evaluated by mixing with the reference a Pulse Width Modulation (PWM) signal that drives the Tx.

Current methods involve relatively complex circuitry that increases cost and also have limited ability to handle signal variations. Other implementations may use direct sampling of the signal. However, the sampling rate needs to be higher than twice the frequency of the signal, which would involve sampling above 200 kHz-400 kHz. Processing of this rate of samples requires significant processing resources and usage of complex processors.

Thus, there is a need to improve current wireless power transfer methods.

SUMMARY

According to one embodiment, a power transmitter is provided. The power transmitter may synchronize a sampling start time to a pulse-width modulation (PWM) signal. The power transmitter may determine an average sampling rate for sampling a power carrier signal. The power transmitter may sample the power carrier signal to obtain sample values. The power transmitter may process the sampled values. The sampling rate may be N times a data rate. The power carrier may process the samples values by determining whether a transmitted bit is a '0' or '1'. The power transmitter may determine whether a transmitted bit is a '0' or '1' based on a state of the power transmitter, wherein a state of the power transmitter comprises a preamble detection state, a zero search state, and a packet reception state.

According to one embodiment, the power transmitter may sample a power carrier signal. The power transmitter may process the sampled power carrier signal using two digital match filters to produce two separate digital match filter outputs. The power transmitter may determine an amplitude of peaks for the two separate digital match filter outputs. The power transmitter may determine an interval between bits for the two separate digital match filter outputs. The power transmitter may determine whether a transmitted bit is a '0' or '1'.

According to one or more embodiments, the power transmitter embodiments above may be implemented as a system, a method, an apparatus, or a computer program product, along with a power transmitter.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
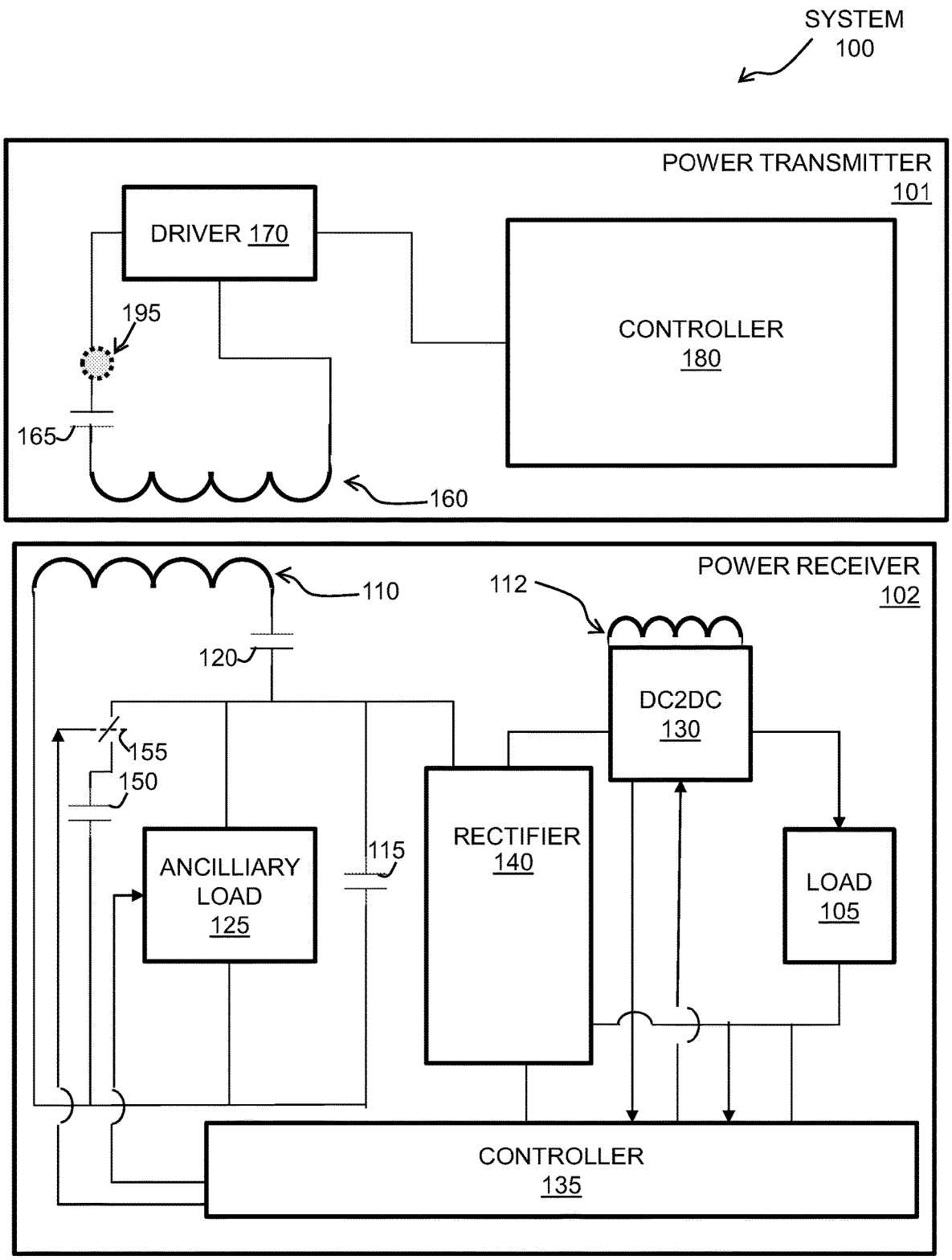
FIG. 1 depicts a block diagram depicting a power receiver and a power transmitter of a system in accordance with one or more embodiments.

Embodiments disclosed herein may include apparatuses, systems, methods, and/or computer program products (generally discussed herein as a system) that provide for a power receiver (Rx) that is capable of transmitting data to a power transmitter (Tx) using load modulation on a power carrier. The Tx is capable of sampling/detecting current, voltage, or a phase change of the power carrier and data demodulating to recover the data.

According to one or more advantages, technical effects, and benefits, the system minimizes additional circuitry for the Tx and Rx and design cost by using lower sampling and processing rates compared to standard methods. For example, a sampling rate that is N times a data rate of the data signal, typically 2 kHz, may be used. In an embodiment N may be as low as 4. In an embodiment, N may be 16.

According to one or more embodiments, a power transmitter is disclosed. The power transmitter may be in communication with a power receiver. The power transmitter may be configured to synchronize a sampling start time to a pulse-width modulation (PWM) signal.

According to one or more embodiments of the power transmitter or in combination with one or more of the power transmitter embodiments described herein, the power transmitter may be further configured to determine an average sampling rate for sampling a power carrier signal. The power carrier signal may be generated by the PWM signal.

According to one or more embodiments of the power transmitter or in combination with one or more of the power transmitter embodiments described herein, the power transmitter may be further configured to sample the power carrier signal to obtain sample values.

According to one or more embodiments of the power transmitter or in combination with one or more of the power transmitter embodiments described herein, the power transmitter may be further configured to process the sampled values.

According to one or more embodiments of the power transmitter or in combination with one or more of the power transmitter embodiments described herein, the average sampling rate may be N times a data rate of the power carrier signal.

According to one or more embodiments of the power transmitter or in combination with one or more of the power transmitter embodiments described herein, the power transmitter may be further configured to determine whether a transmitted bit is a '0' or '1'.

According to one or more embodiments of the power transmitter or in combination with one or more of the power transmitter embodiments described herein, the power transmitter may be further configured to determine whether a transmitted bit is a '0' or '1' based on a state of the power transmitter.

According to one or more embodiments of the power transmitter or in combination with one or more of the power transmitter embodiments described herein, a state of the power transmitter may comprise a preamble detection state, a zero search state, and a packet reception state.

According to one or more embodiments of the power transmitter or in combination with one or more of the power transmitter embodiments described herein, the power transmitter may be further configured to sample the power carrier signal based on the synchronized start time and determined average sampling rate.

According to one or more embodiments of the power transmitter or in combination with one or more of the power transmitter embodiments described herein, the power transmitter may be further configured to directly sample the power carrier signal.

According to one or more embodiments of the power transmitter or in combination with one or more of the power transmitter embodiments described herein, the power transmitter may be further configured to skip a cycle for sampling such that sampling is not performed for every cycle.

According to one or more embodiments of the power transmitter or in combination with one or more of the power transmitter embodiments described herein, the power transmitter may be further configured to sample a power carrier signal.

According to one or more embodiments of the power transmitter or in combination with one or more of the power transmitter embodiments described herein, the power transmitter may be further configured to process the sampled power carrier signal using two digital match filters to produce two separate digital match filter outputs.

According to one or more embodiments of the power transmitter or in combination with one or more of the power transmitter embodiments described herein, the power transmitter may be further configured to determine an amplitude of peaks for the two separate digital match filter outputs.

According to one or more embodiments of the power transmitter or in combination with one or more of the power transmitter embodiments described herein, the power transmitter may be further configured to determine an interval between bits for the two separate digital match filter outputs.

According to one or more embodiments of the power transmitter or in combination with one or more of the power transmitter embodiments described herein, the power transmitter may be further configured to determine whether a transmitted bit is a '0' or '1'.

According to one or more embodiments of the power transmitter or in combination with one or more of the power transmitter embodiments described herein, the power transmitter may be further configured to process the two separate digital match filter outputs through a digital low pass filter.

According to one or more embodiments of the power transmitter or in combination with one or more of the power transmitter embodiments described herein, the two digital match filters comprise one digital match filter for a '0' bit and one digital match filter for a '1' bit.

According to one or more embodiments of the power transmitter or in combination with one or more of the power transmitter embodiments described herein, for a sampling rate of N, the digital match filter for the '0' bit may comprise N*2 values, and wherein the N*2 values may comprise N/2 '−1' values, N '1' values, and N/2 '−1' values.

According to one or more embodiments of the power transmitter or in combination with one or more of the power transmitter embodiments described herein, for a sampling rate of N, the digital match filter for the '1' bit may comprise N*2 values, and wherein the N*2 values may comprise N/2 '1' values, N/2 '−1' values, N/2 '1' values, and N/2 '−1' values.

According to one or more embodiments of the power transmitter or in combination with one or more of the power transmitter embodiments described herein, for a sampling rate of N, the digital match filter for the '1' bit may comprise N values, and wherein the N values may comprise N/2 '1' values and N/2 '−1' values.

According to one or more embodiments of the power transmitter or in combination with one or more of the power transmitter embodiments described herein, an output of at least one of the two separate digital match filter outputs may be processed via a digital filter that sums K samples, wherein K<(N/2), wherein N is a sampling rate.

FIG. 1 shows a block diagram depicting a system 100 in accordance with one or more embodiments. The system comprises a power transmitter 101 and a power receiver 102 (referred herein as Tx 101 and Rx 102, respectively). The Tx 101 is any device that may generate electromagnetic energy to a space around the Tx 101 that is used to provide power to the Rx 102. The Rx 102 is any device that may receive, use, and/or store the electromagnetic energy when present in the space around the Tx 101.

As shown in FIG. 1, the Tx 101 includes circuitry for generating and transmitting the electromagnetic energy (e.g., transmitting power). The circuitry of the Tx 101 may include a coil 160; a capacitor 165; a driver 170; and a controller 180. The coil 160 and the capacitor 165 provide an LC circuit for generating an inductive current in accordance with operations of the driver 165 and the controller 180 to support power transmissions.

According to one or more embodiments, the controller 180 may transmit and/or receive information and instructions between the controller 180 and elements of the Tx 101 (e.g., such as the driver 170 and a wiring junction 195).

According to one or more embodiments, the controller 180 may sense one or more currents or voltages, such as a DC input voltage (Vin) and a DC output voltage (Vout). According to one or more embodiments, the controller 180 may activate one or more switches to change the resonance frequency. For example, with respect to the Rx 102, the controller 135 may activate the switch 155 to add the capacitor 150 in parallel to the resonance circuit, thus adding the equivalent capacitance of the at least one capacitor, which subsequently alters the resonance frequency. Further, the Rx 102 and/or the Tx 101 may include multiple switches for multiple frequencies.

According to one or more embodiments, the controller 180 may utilize firmware as a mechanism to operate and control operations of the Tx 101. In this regard, the controller 180 may be a computerized component or a plurality of computerized components. According to one or more embodiments, the controller 135 and 180 may also cause the system to participate in in-band communications.

As shown in FIG. 1, the Rx 102 includes circuitry for receiving and storing electromagnetic energy, such as a load 105. The circuitry of the Rx 102 may also include a resonance coil 110; a parallel resonance capacitor (capacitor) 115; a serial resonance capacitor (capacitor) 120; an ancillary load 125; a direct current to direct current converter (DC2DC) 130; a controller 135; and a rectifier 140. In accordance with some example embodiments, the Rx 102 may be used to wirelessly obtain induced power from the Tx 101 for supplying power to a load 105. For example, the Rx 102 may be used for charging the load 105, examples of which include handheld battery, a power supply, a combination thereof, and the like. Additionally, the Rx 102 may be capable of wireless communication with the Tx 101 (e.g., in-band communication). According to one or more embodiments, a resonate section (circuit) of the Rx 102 may include the coil 110 covered with ferrite, the capacitor 120, and the capacitor 115, a power-supply section of the Rx 102 may include the rectifier 140 and the DC2DC 130, and a control and communication section of the Rx 102 may include the controller 135 and the ancillary load 125.

The values of the resonance circuit components are defined to match with a transmitted frequency of the Tx 101. The Rx 102 may be provided with or without the capacitor 115. Additionally, or alternatively, the resonance circuit may further comprise at least one branch each having a tuning capacitor (rcap) 150 and a switch 155 controlled by the controller 135.

The rectifier 140 of the power supply section may be utilized for converting AC voltage attained by the resonance circuit to DC voltage. The rectifier 140 may be based on commercially available half-wave rectification; full-wave rectification; controlled (e.g., field-effect transistor-based of FET based) full-wave rectification; and any combination thereof, or the like. According to one or more embodiments, the rectifier 140 may be any rectifier using one or more components, such as 4 diodes (e.g., asynchronous rectifier), 2 didoes and 2 FETs (half synchronous), 4FET (synchronous), or 2 capacitors and 2 switches, that are controlled by either a dedicated logic circuit or the controller 135.

According to one or more embodiments, the DC2DC 130, of the power supply section, may be utilized for adjusting output voltage and/or current, attained from the rectifier 140, to the load 105. According to one or more embodiments, the DC2DC 130 may be a DC-to-DC converter capable of stepping up its output voltage magnitude, above its input voltage, and/or stepping down its output voltage to almost zero. To do so the DC2DC utilizes inductor 112 used for both the stepdown mode and step-up mode. The DC2DC 130 may be based on the principles of a switched mode power supply having its output voltage vary, across a relatively large range. The output voltage of the DC2DC 130 may be regulated by varying frequency and duty-cycle of the DC2DC 130 switching, such as a switch mode power-supply, with a switching signal generated at controller 135.

According to one or more embodiments, the controller 135 may be a computerized component or a plurality of computerized components. The controller 135 may include a central processing unit (CPU) based on a microprocessor, an electronic circuit, an integrated circuit, implemented as special firmware ported to a specific device such as a digital signal processor, an application specific integrated circuit, and any combination thereof, or the like. The controller 135 may include a computer program product that stores a computer readable storage medium. According to one or more embodiments, the controller 135 may be utilized to perform computations required by the Rx 102 or any of the circuitry therein.

The controller 135 may also comprise an input/output (I/O) module utilized as an interface to transmit and/or receive information and instructions between the controller 135 and elements of the Rx 102, such as ancillary load 125; DC2DC 130; rectifier 140; at least one switch 155. According to one or more embodiments, the controller 135 may activate, through the I/O module, the ancillary load 125 with a signal that incapsulates information encoded by controller 135. The ancillary load 125 may be connected before or after rectifier 140. The signal may be configured to excite the ancillary load 125 in a way that impacts the coupling between the Rx 102 and the Tx 101, so a detection circuit of the Tx 101 may decode the information. Note that the controllers 135 and 180 may be similarly configured.

According to one or more embodiments, the controller 135 may sense, through the I/O module, the DC input voltage (Vin) and DC output voltage (Vout) of the DC2DC 130. The controller 135 may also sense a current (i) flowing from the DC2DC 130 to the load 105. Additionally, or alternatively, the controller may regulate the output voltage of the DC2DC 130 with a switching signal. According to one or more embodiments, the controller 135 may activate, through the I/O module, one or more switches of the at least one switch 155 to change the resonance frequency. By activating, with the at least one switch 155, the at least one capacitor (e.g., such as rcap 150) may be added in parallel to the resonance circuit, thus adding the equivalent capacitance of the at least one capacitor, which subsequently alters the resonance frequency.

According to one or more embodiments, controller 135 may cause the Rx 102 to participate in in-band communications with the Tx 101. In this regard, the controller 135 may determine/detect/sense one or more signals (e.g., values, losses, impulse responses, data, and other parameters). Note that additional location are contemplated by the system 100, such as the controller 135 may determine/detect/sense one or more signals with respect to a shunt resistor of the Rx 102. Accordingly, the controller 135 may utilize the one or more signals to receive in-band communication from the Tx 101, to perform digital signal processing on the in-band communication, and to the instruct the circuitry therein to respond to the Tx 101.

Figure 2:
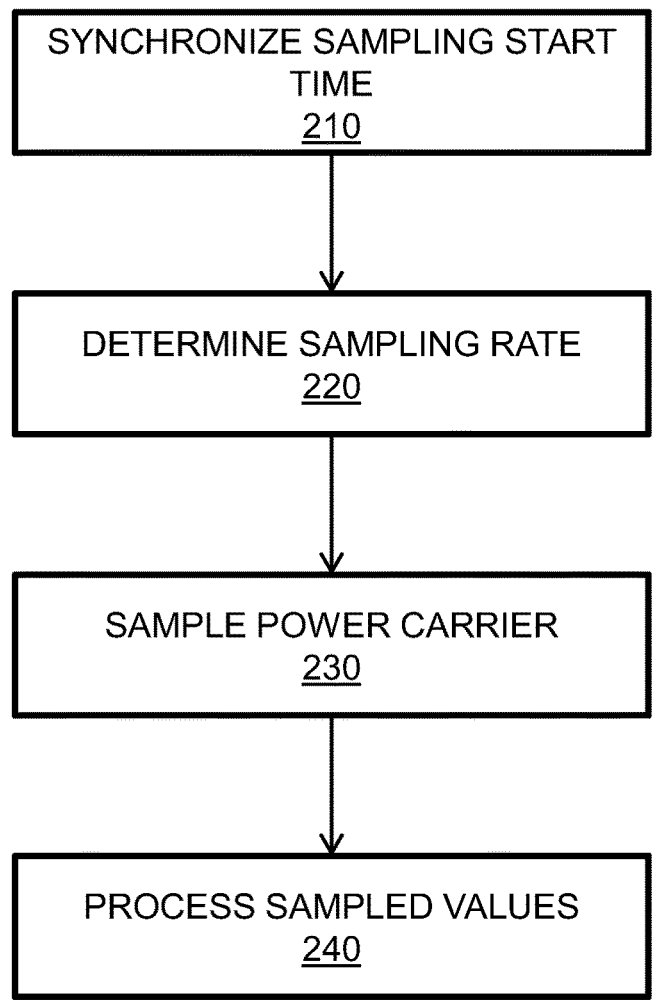
FIG. 2 depicts a method of a system in accordance with one or more embodiments.

FIG. 2 shows a method 200 of a system (e.g., the system 100 of FIG. 1) in accordance with one or more embodiments. The method 200 may be executed by the controller 180 of a Tx 101. Further, the method 200, generally, is an example of direct sampling of the power carrier signal.

In the method 200, a Tx synchronizes a sampling start time to a pulse-width modulation (PWM) signal (210). The PWM signal controls the generation of the power carrier. The Tx determines a sampling rate (220). The sampling rate may be an average sampling rate. The sampling rate may be N times the rate of the data signals. N may be as low as 4, but may typically be 16 and may be up to 32. A typical data rate may be 2 kHz. The PWM signal may control the generation of the power carrier. The Tx may initiate the PWM signals and the data receiver for sampling is part of the Tx and both functions may be implemented on the same controller. The Tx may sample the power carrier signal based on the start time and determined sampling rate (230). The sampling may be done, for example, between the inductor and the capacitor of the resonance circuit. The Tx may process the sampled values (240). The sampled values may be a current or voltage of a primary coil of the Tx.

Sampling may be performed, not necessarily on fixed intervals, but may be toggled between two possible values. One possible value may provide a data rate that may be higher or just slightly higher than a desired date rate, and another possible value may provide a data rate that is lower or just slightly lower than the desired data rate.

Figure 3:
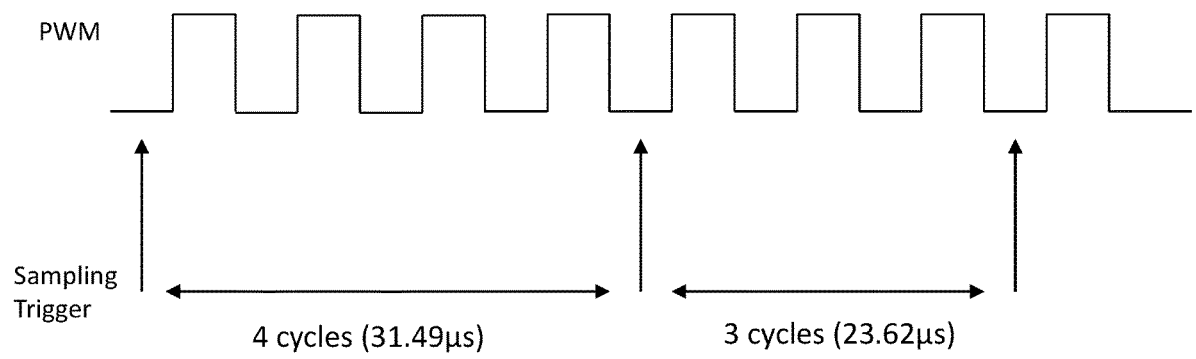
FIG. 3 depicts an example of sampling timing.

In an example, a carrier frequency may be assumed to be 127 kHz. A desired data rate may be 2 kHz. N may be selected to be 16. An average sampling is 1/(2 kHz*16)=31.25 μs. The carrier cycle time is $\frac{1}{127}$ kHz=7.874 μs. As shown in FIG. 3, sampling may be performed every $3^{rd}$ carrier cycle (23.62 μs) or every $4^{th}$ carrier cycle (31.49 μs) such that an average sampling rate is once every 31.25 μs.

In an embodiment, sampling may be performed in synchronization to the PWM. However, the sampling may not be performed for every cycle, but the sampling may skip over one or more cycles to achieve a desired rate, such as an above average rate.

Figure 4:
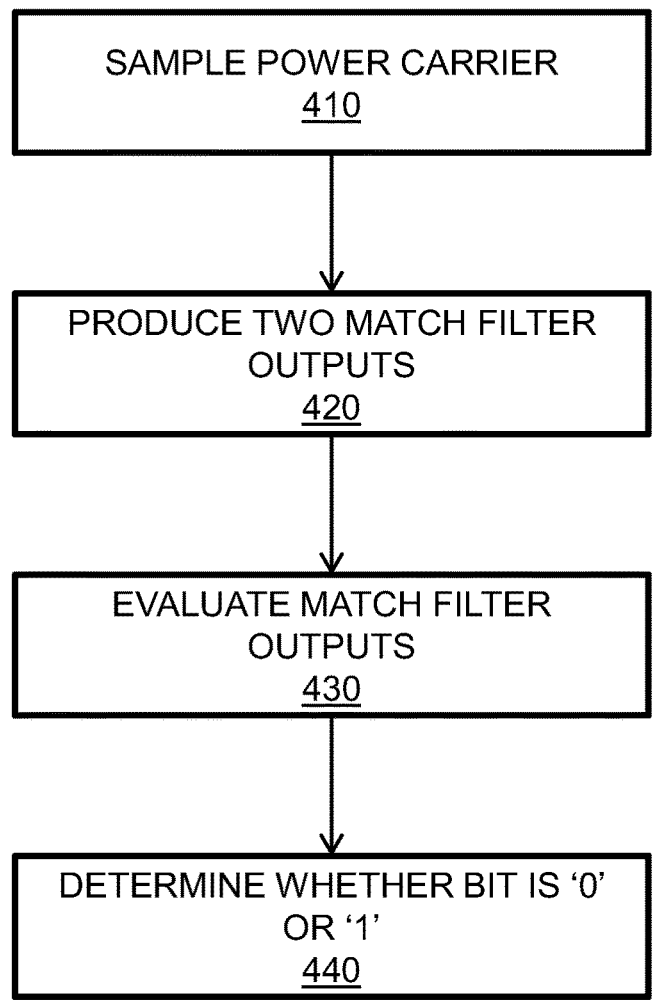
FIG. 4 depicts a method of a system in accordance with one or more embodiments.

In an embodiment, as shown in FIG. 4 an example method 400 includes a Tx using two separate match filters. A Tx may sample a power carrier signal (410). The Tx may use two separate digital match filters to convolute the samples to produce two separate digital match filter outputs (420). In an embodiment, each of these two separate digital match filter outputs may be further filtered using a digital low pass filter (LPF). The Tx may evaluate each of the digital match filter outputs and determine amplitude of peaks and interval between bits (430). The peaks may be positive and/or negative. The Tx may determine whether the transmitted bit is a '0' or '1' (440). The Tx may determine whether the transmitted bit is a '0' or '1' by comparing the interval of the peaks and an amplitude of at least one of the filters to each other and/or to a fixed thresholds or thresholds.

In an embodiment, for a selected N, a match filter for the '0' bit may comprise N*2 values, starting with N/2 '−1' values, N '1' values, and ending with N/2 '−1' values. For example where N=16, the match filter for the '0' bit may comprise 32 values starting with eight '−1' values, followed by sixteen '1' values, and ending with eight '−1' values. In an embodiment, for a selected N, a match filter for the '1' bit may comprise N*2 values, starting with N/2 '1' values, N/2 '−1' values, N/2 '1' values, and ending with N/2 '−1' values. For example, where N=16, the match filter for the '1' bit may comprise 32 values starting with eight '1' values, followed by eight '−1' values, followed by eight '1' values, and ending with eight '−1' values. In an embodiment, for a selected N, a match filter for the '1' bit may comprise N values, starting with N/2 '1' values followed by N/2 '−1' values. For example, where N=16, the match filter for the '1' bit may comprise 16 values starting with eight '1' values, followed by eight '−1' values.

Figure 5:
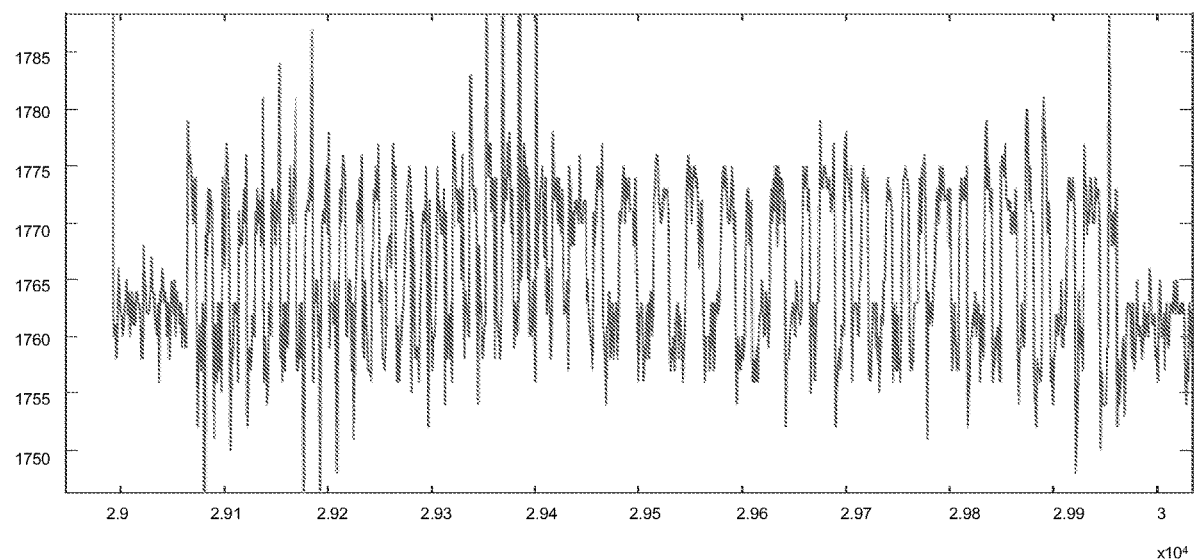
FIG. 5 shows an example graph of sample data and output of matched filters in accordance with one or more embodiments.
Figure 6:
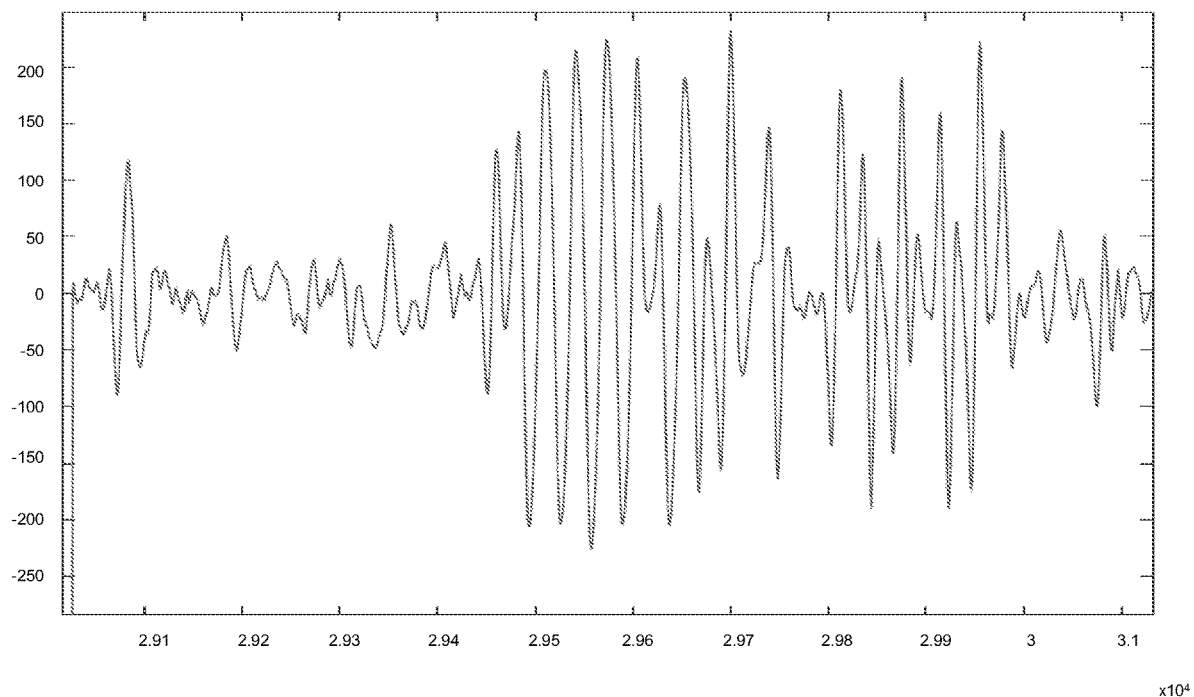
FIG. 6 shows an example graph of sample data and output of matched filters in accordance with one or more embodiments.
Figure 7:
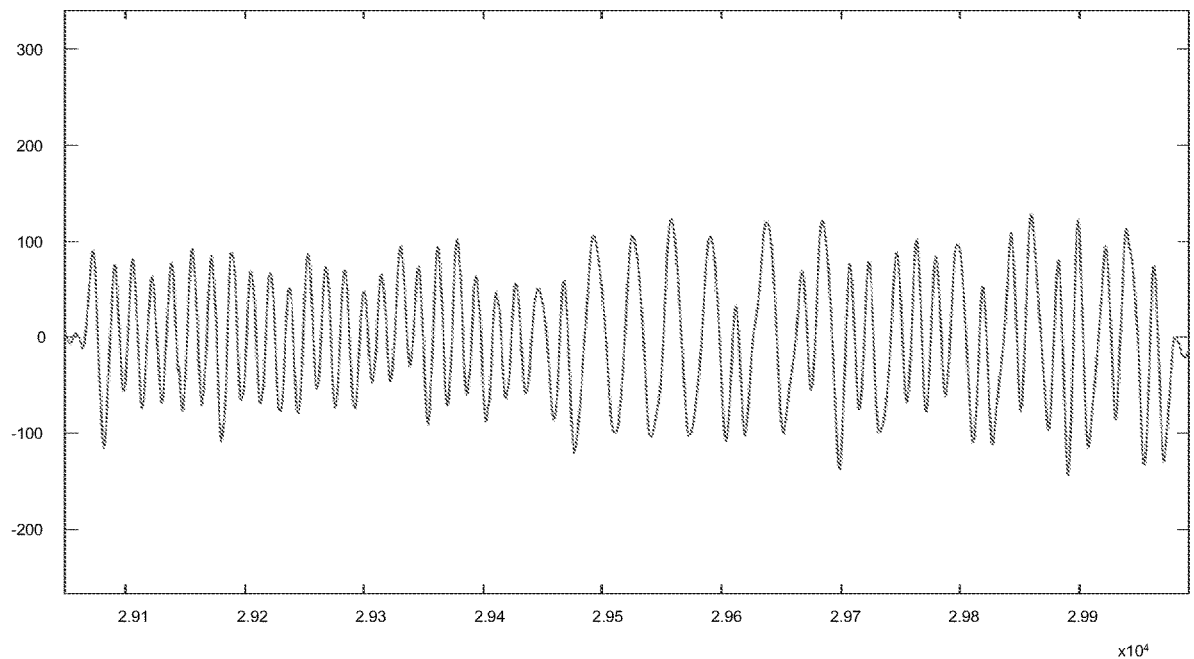
FIG. 7 an example graph of sample data and output of matched filters in accordance with one or more embodiments.

FIGS. 5, 6, and 7 shows examples of sampled data and an output of a '0' match filter and '1' match filter for that data. Other filter patterns that differentiate between the two bit patterns may be used.

FIG. 5 shows a sampled signal. A sampling rate may be set to N time a data rate. In this example, N=16 and the data rate is 2 kHz, so the sampling rate is 32 kHz. The x-axis of FIG. 5 denotes the sample number and the y-axis denotes the sampled value out of a 12 bit range of the processor A/D converter. Each sample step may be equivalent to 40 mV.

FIG. 6. shows the processed samples of FIG. 5 after passing through a '0' filter. The '0' filter in this example is 32 taps long, with the first eight being '−1', the next sixteen being '1', and last eight being '−1'.

FIG. 7. shows the processed samples of FIG. 5 after passing through a '1' filter. The '1' filter in this case is 16 taps long, with the first eight being '−1' and the last eight being '1'.

In an embodiment, an output of the match filters may be further transferred via a digital filter that may perform summation of a last number samples. In an example, the last number of samples is four.

In an embodiment, an interval between alternating positive and negative peaks of a '0' match filter is evaluated. If the interval matches, with a certain margin, for example +/−3, the interval between bits (i.e. N=16 samples) then a '0' bit is recognized, else a '1' bit is recognized.

In an embodiment, an interval between matching positive or negative peaks of a '1' match filter is evaluated and compared to the bit period as for the '0' channel. The bit may be detected as '0' or '1' if one of the filter intervals is a match, and in case neither has a match or both has a match, the amplitude of peaks may be compared to determine what bit was received.

In an embodiment, operation of a modem may be modified according to a reception stage of a message. The message may be a structured message, such as a message according to WPC standard. For example, the message may comprise one or more of the following: a preamble, a start bit, data bits, a parity bit, and a stop bit. A state of a preamble reception vs. a start bit, data bits, a parity bit, or a stop bit may be defined.

The modem may use different criteria to determine a '0' bit reception or a '1' bit reception based on a message reception stage. The criteria may be a combination of peak intervals of '0' and '1' match filter outputs and an amplitude of the detected peaks of the filters.

In an embodiment, when the modem is in a preamble reception stage of a message, the peak intervals of a '1' match filter may be monitored for repeated '1' bits that indicate a packet preamble. If more than N peaks out of K consecutive peaks are detected, a preamble detection may be declared.

In an embodiment, when the modem is in a search for start bit phase, which may follow reception of a preamble, the modem may search for a matching interval of peaks on the '0' match filter and for the peak to be higher than a threshold. In an embodiment, the threshold may be determined based on an amplitude of peaks detected on the '1' match filter during preamble detection.

In an embodiment, the modem may use a set of one or more predefined digital distortion correction filters that may be used before or after a match filter operation. The operation of these filters may be activated or disabled according to specific conditions that relate to detected preamble properties and/or an operation frequency and/or system load. In an embodiment, a distortion filter may be an integration function of the output of a '0' and '1' match filter that may sum four consecutive samples of the output of the filters. In an embodiment, the distortion filter may activate if the operation frequency of the system as measured by the receiver has a frequency that is lower than a predefined threshold.

In an embodiment, the shape of a '1' match filter output may be evaluated when a preamble is detected. The evaluation process may comprise detecting a specific distortion that may be caused due to a rectifier capacitor effect and may be expressed as a decay in the amplitude of a change in envelope amplitude during a state. The operation of a distortion correction filters may be activated if the shape is determined to be distorted. In an embodiment, a preamble filter may be deemed distorted if during the preamble detection the ratio between the output of the '1' and '0' filters output is below a certain threshold. For an optimal signal the '0' filter output should be close to 0 for a received '1' bit. In an embodiment, the consistency of gaps between peaks of the '1' filter may be evaluated, and the signal may be considered distorted if the gaps are not stable.

In an embodiment, a correction filter may be a notch filter that may filter out specific frequencies. A specific frequency to filter out may be related to a difference in frequency between operational frequency and system self-resonance frequency. In an embodiment, the operation of the filter may be used only for the '0' or '1' match filter. In another embodiment, the filter may be activated only when a system load is low or a system is in a specific state, such as an example identification and configuration vs. power transfer.

In an embodiment, the system may be operating close to self-resonance of inductive coupling, and as a result a fluctuation, for example 8 kHz, on the carrier may be created when the system is operating with a light load, for example below 5 W. The system may include an implementation of a notch filter to remove the 8 kHz undesired signal. One implementation of a filter may be a summation of two consecutive samples. Although this may not be an optimal notch filter, it may have a zero response for the 8 khz frequency, and it may be implemented with minimal computation efforts.

In an embodiment, a limiter function may be applied to the input samples to the filters limiting the sample values to a +/− limit around the samples average value. In an embodiment, a limiter function may be set to +/−5 samples (i.e. equivalent to +/−200 mV). A sample value that is more than five above an average (AVG) may be considered as AVG+5, and a sample that is lower than five below the average (AVG) may be considered AVG−5.

Figure 8A:
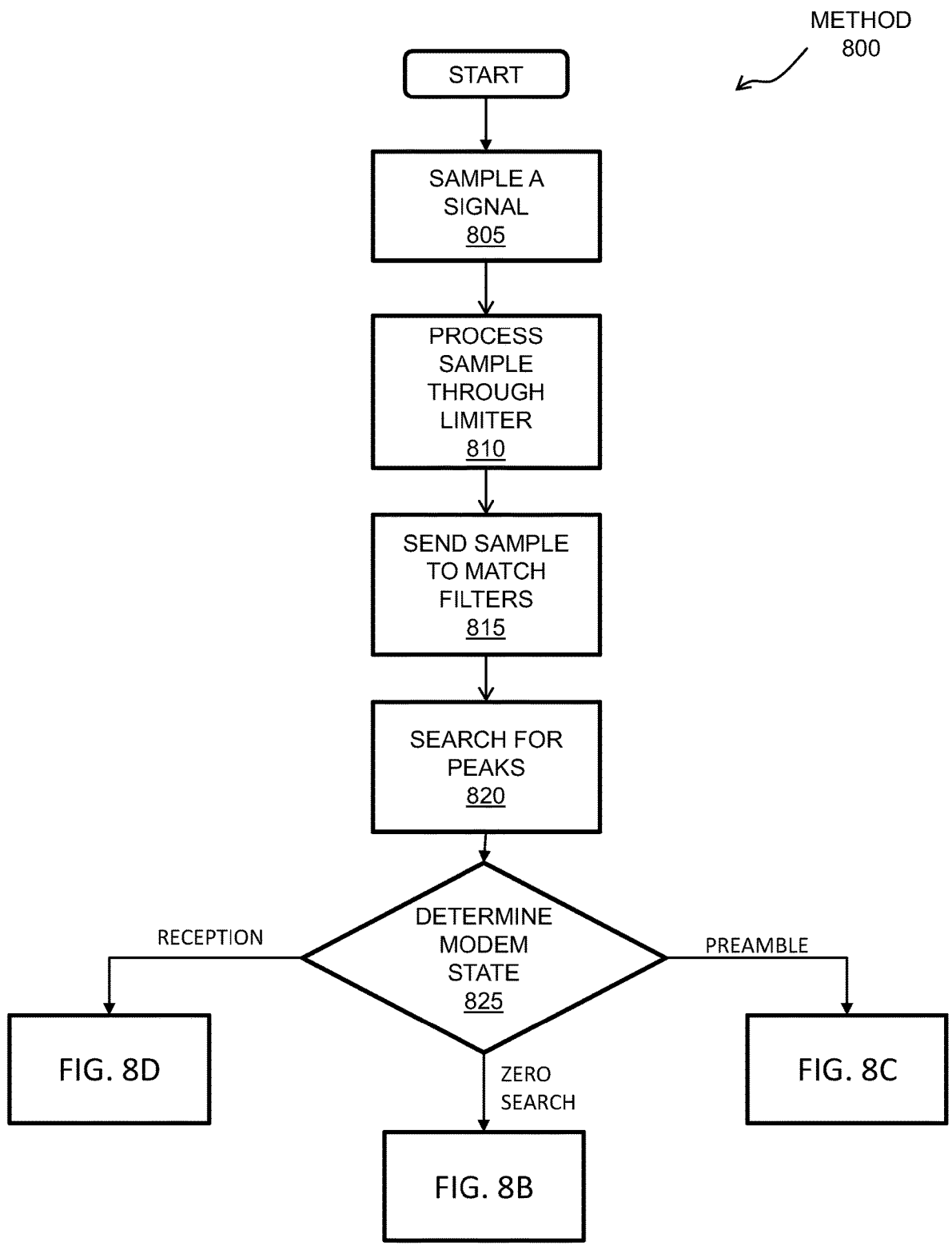
FIG. 8A depicts a method of a system in accordance with one or more embodiments that includes using a limiter function to limit an amplitude.

In an embodiment, as shown in FIG. 8A, a method 800 includes using a limiter function to limit an amplitude above or below an average. A Tx may sample a signal (805). The Tx may produce a limited sample by processing the sample through a limiter function to limit the amplitude above or below an average (810). The Tx may send the limited sample to a '0' match filter and a '1' match filter (815). The Tx may search the output of the '0' match filter and a '1' match filter for peaks (820). Further processing may split and be based on a current state of the modem. The Tx may determine a current state of the modem (825). A state of the modem may be, for example, a preamble search state, a zero search state, or a message reception state.

Figure 8B:
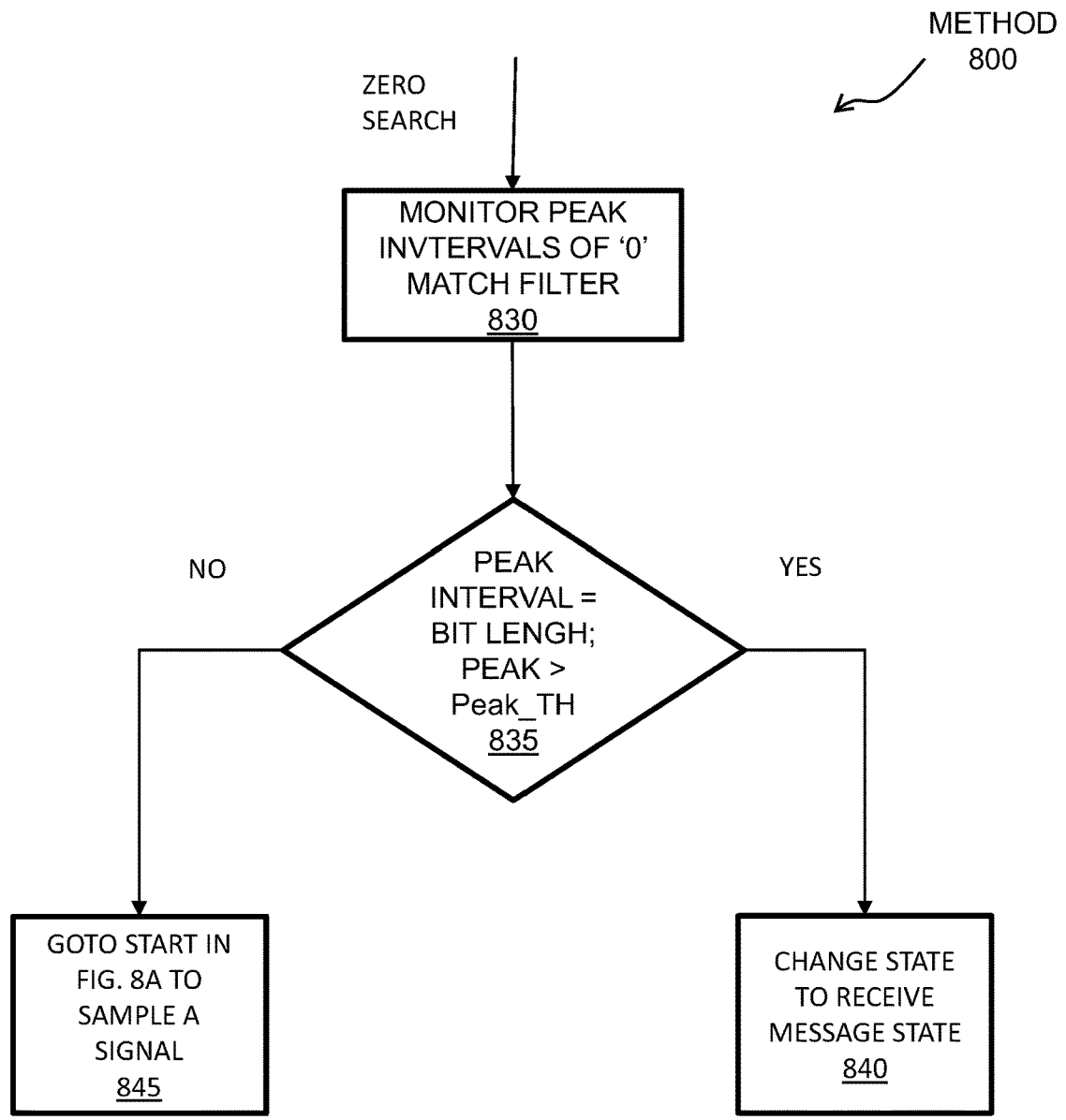
FIG. 8B depicts a method when a modem is in a zero search state.

In an embodiment, as shown in FIG. 8B, on a condition that the state of the modem is determined to be a zero search state, the Tx may monitor the peak intervals of the '0' match filter (830). The Tx determines whether the peak interval matches the bit length and the peak is above a predefined peak threshold (e.g. Peak_TH) (835). If the peak interval matches the bit length and the peak is above a predefined peak threshold, the TX may change the state of the modem to a receive message state (840). If the peak interval does not match the bit length or the peak is not above a predefined peak threshold (e.g. Peak_TH), the TX may sample another signal (845).

Figure 8C:
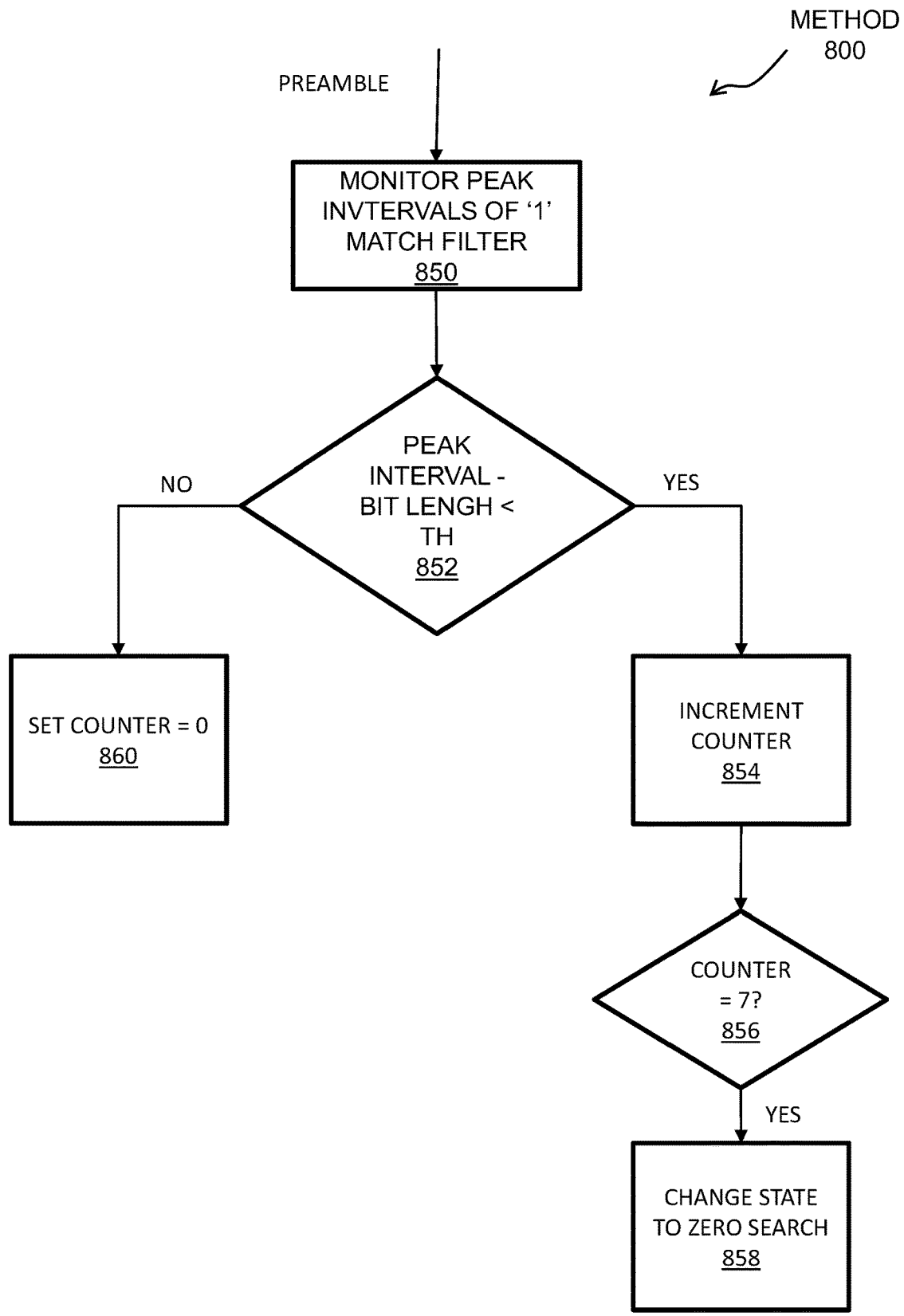
FIG. 8C depicts a method when a modem is in a preamble search state.

In an embodiment, as shown in FIG. 8C, on a condition that the state of the modem is determined to be a preamble search, the Tx may monitor the peak intervals of the '1' match filter (850). The Tx determines whether the peak interval minus the bit length is below a predefined timing error threshold (852). If the interval matches, the TX may increment a counter (854). The Tx may determine whether there have been a predetermined number of consecutive peaks (856). The predetermined number may be seven, for example. The Tx may determine whether there have been a predetermined number of consecutive peaks by comparing the counter to the predetermined number. If the counter is equal to the predetermined number, the Tx may change the state of the modem to a zero search state (858). If the interval does not match, the Tx may set the counter to zero (860).

Figure 8D:
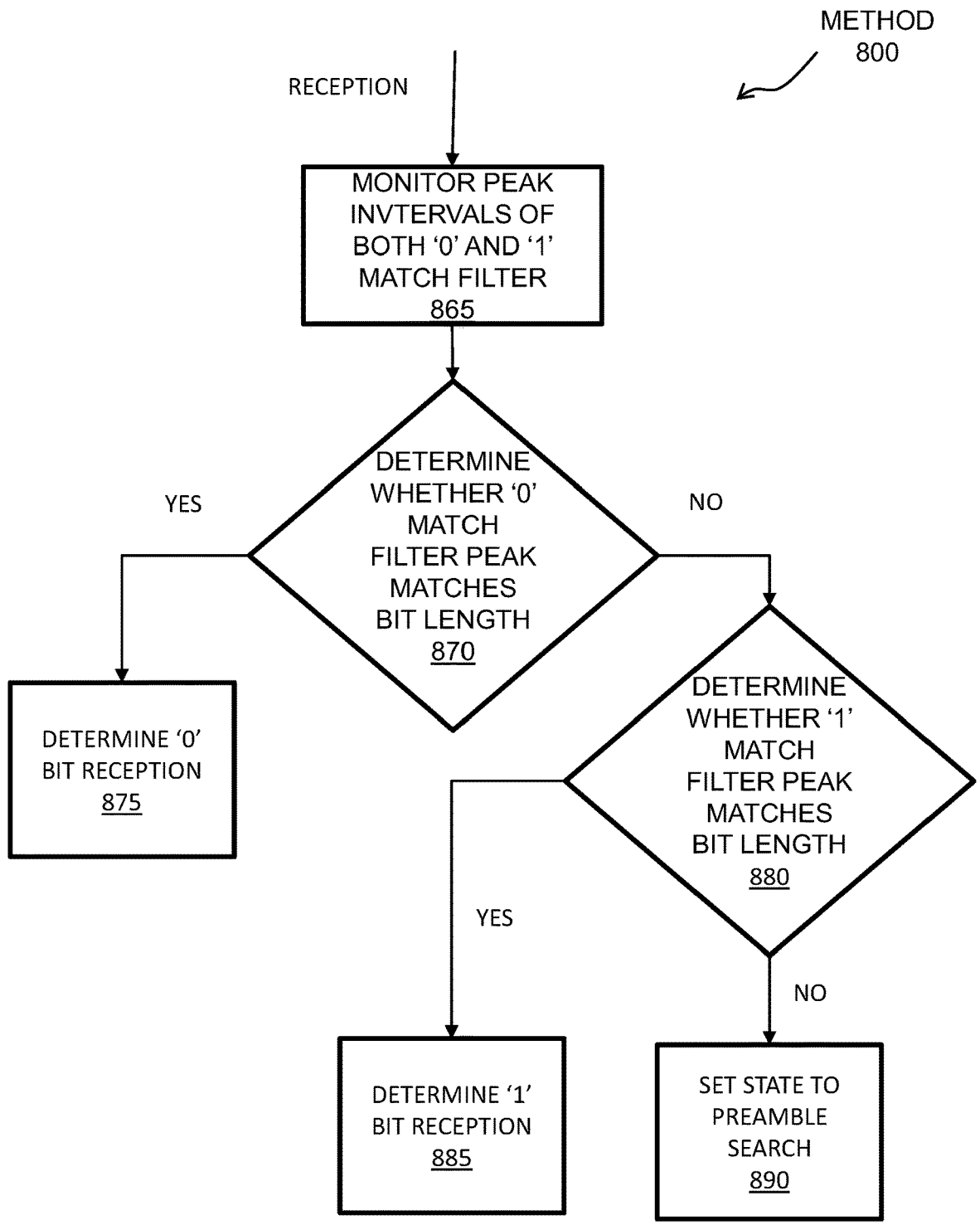
FIG. 8D depicts a method when a modem is in a message reception state.

In an embodiment, as shown in FIG. 8D, on a condition that the state of the modem is determined to be a receive message state, the Tx may monitor the peak intervals of both the '0' match filter and the '1' match filter (865). The Tx may determine whether the '0' match filter peak matches the bit length (870). If the '0' filter peak interval matches the bit length, the Tx may determine a '0' bit reception (875). If the '0' filter peak interval does not match the bit length, the Tx may determine whether the '1' filter peak interval match the bit length (880). If the '1' filter peak interval match the bit length, the Tx may determine a '1' bit reception (885). If the '1' filter peak interval does not match the bit length, the Tx may set the modem state to a preamble search state (890).

According to one or more advantages, technical effects, and benefits, the system minimizes additional circuitry for the Tx and Rx and design cost by using lower sampling and processing rates compared to standard methods. Additionally, the system is more efficient and may be implemented on a low-cost or slow CPU with low burden.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A power transmitter executing communication with a power receiver, the power transmitter configured to:
   synchronize a sampling start time to a pulse-width modulation (PWM) signal;
   determine an average sampling rate for sampling a power carrier signal, wherein the power carrier signal is generated by the PWM signal;
   sample the power carrier signal to obtain sample values;
   limit an amplitude above or below an average of the sampled values to produce limited sampled values;
   send the limited sample values to a 0 match filter and a 1 match filter;
   search outputs of the 0 match filter and 1 match filter for peaks;
   determine a current modem state; and
   process the outputs of the 0 match filter and the 1 match filter based on the determined current modem state.

2. The power transmitter of claim 1, wherein the average sampling rate is N times a data rate of the power carrier signal, wherein N is an integer larger than zero.

3. The power transmitter of claim 1, wherein the power transmitter is configured to sample the power carrier signal based on the synchronized sampling start time and the determined average sampling rate.

4. The power transmitter of claim 1, wherein the power transmitter is configured to directly sample the power carrier signal.

5. The power transmitter of claim 1, wherein the power transmitter is configured to skip a cycle for sampling, such that sampling is not performed for every cycle.

6. A method implemented by a power transmitter that communicates with a power receiver, the method comprising:
   synchronizing a sampling start time to a pulse-width modulation (PWM) signal;
   determining an average sampling rate for sampling a power carrier signal;
   sampling the power carrier signal to obtain sample values;
   limiting an amplitude above or below an average of the sampled values;
   for producing limited sampled values;
   sending the limited sample values to a 0 match filter and a 1 match filter;
   searching outputs of the 0 match filter and 1 match filter for peaks;
   determining a current modem state; and
   processing the outputs of the 0 match filter and the 1 match filter based on the determined current modem state.

7. The method of claim 6, wherein the sampling rate is N times a data rate of the power carrier signal, wherein N is an integer larger than zero.

8. The method of claim 6 further comprising sampling the power carrier signal based on the synchronized start sampling start time and the determined average sampling rate.

\* \* \* \* \*